United States Patent
Wang et al.

(10) Patent No.: US 6,794,057 B2
(45) Date of Patent: Sep. 21, 2004

(54) LAMINATED ANTIFERROMAGNETICALLY COUPLED MEDIA FOR DATA STORAGE

(75) Inventors: Jian-Ping Wang, Singapore (SG); Seidikkurippu Nellainayagam Piramanayagam, Singapore (SG)

(73) Assignee: Data Storage Institute, Singapore (SG)

( * ) Notice: Subject to any disclaimer, the term of this patent is extended or adjusted under 35 U.S.C. 154(b) by 0 days.

(21) Appl. No.: 10/172,994

(22) Filed: Jun. 18, 2002

(65) Prior Publication Data

US 2003/0087135 A1 May 8, 2003

(30) Foreign Application Priority Data

Nov. 8, 2001 (SG) .......................................... 200106878

(51) Int. Cl.⁷ .............................................. G11B 5/673
(52) U.S. Cl. ...................... 428/611; 428/622; 428/668; 428/678; 428/65.3; 428/213; 428/336; 428/694 TS; 428/694 TM
(58) Field of Search ................................ 428/611, 622, 428/668, 678, 65.3, 213, 336, 694 TS, 694 MM, 694 TM (56) References Cited

U.S. PATENT DOCUMENTS

| | | | |
|---|---|---|---|
| 6,316,097 B1 * | 11/2001 | Liu et al. .................... | 428/332 |
| 6,372,330 B1 * | 4/2002 | Do et al. .................... | 428/212 |
| 6,383,668 B1 * | 5/2002 | Fullerton et al. .... | 428/694 TM |
| 6,562,453 B1 * | 5/2003 | Futamoto et al. .......... | 428/332 |
| 6,635,367 B2 * | 10/2003 | Igarashi et al. ....... | 428/694 TM |
| 2002/0028357 A1 * | 3/2002 | Shukh et al. ......... | 428/694 TM |
| 2002/0064689 A1 * | 5/2002 | Yamanaka et al. ... | 428/694 TM |
| 2002/0071967 A1 * | 6/2002 | Do et al. ............... | 428/694 TS |
| 2002/0098390 A1 * | 7/2002 | Do et al. ............... | 428/694 TS |
| 2002/0136930 A1 * | 9/2002 | Oikawa et al. ...... | 428/694 TM |
| 2002/0164506 A1 * | 11/2002 | Bian et al. ............. | 428/694 TS |
| 2003/0022023 A1 * | 1/2003 | Carey et al. ......... | 428/694 MM |

FOREIGN PATENT DOCUMENTS

| | | |
|---|---|---|
| JP | 57-147130 A | 9/1982 |
| JP | 02-108219 A | 4/1990 |
| JP | 05-159389 A | 6/1993 |

OTHER PUBLICATIONS

Abarra, E., Inomata, A., Sato, H., Okamoto, I., and Mizoshita, Y., App. Phys. Let., 77(16), 2000, 2581—2583.*

* cited by examiner

Primary Examiner—Paul Thibodeau
Assistant Examiner—Kevin M. Bernatz
(74) Attorney, Agent, or Firm—Birch, Stewart, Kolasch & Birch, LLP (57) ABSTRACT

A configuration for laminated antiferromagnetically coupled magnetic recording layers for a magnetic recording medium is described. For this purpose, a stabilization layer (top layer) is put on top of the main magnetic recording layer (middle layer) and another stabilization layer (bottom layer) is put under the main magnetic recording layer. The top layer, middle layer and bottom layer are antiferromagnetically coupled. This configuration can double the antiferromagnetic coupling on the recording layer and thus increase the thermal stability. This configuration can also further reduce the remnant magnetization thickness product ($M_r\delta$), which is critical for low noise media. A traditional or new intermediate layer, underlayer and seedlayer can be used under magnetic layers of the present invention. Further, a tradition or new overcoat and lubricant can be used over the magnetic layers of the present invention. A disk fabricated in accordance with the present invention can support a very high density of data storage.

19 Claims, 11 Drawing Sheets

Fig. 1

BACKGROUND ART

Fig. 2

BACKGROUND ART

BACKGROUND ART

Fig. 4(b)

BACKGROUND ART

| Structure of the Magnetic Layers | $H_{cr}$ (@ 1s) (kOe) | $H_o$ (kOe) | SNR (dB) at 320 kfci | Thermal Stability Factor |
|---|---|---|---|---|
| Single layer | 2.7 | 5.2 | 9.94 | 65 |
| 2-layered AFC | 3.5 | 6.2 | 10.93 | 74 |
| Proposed 3-layered AFC | 3.5 | 5.7 | 11.3 | 88 |

Fig. 6

LAMINATED ANTIFERROMAGNETICALLY COUPLED MEDIA FOR DATA STORAGE

BACKGROUND OF THE INVENTION

1. Field of the Invention

This invention relates to the field of data storage devices, such as hard disk drives with thin film magnetic disks. More particularly, the present invention relates to a configuration of, and a method for fabricating, a thin film medium, which can be used for magnetic recording applications requiring ultra high density storage of data.

2. Description of the Relevant Art

The magnetic thin film media in a background art hard disk drive consists of a substrate (Glass, Al alloy etc.), an underlayer of Cr or Cr alloy, a magnetic layer of Co-alloy, and a protective overcoat of carbon and lubricant. The data bits are stored as the transition of magnetization of a group of tiny magnetic grains. The signal to noise ratio (SNR) is roughly proportional to the number of grains.

In accordance with the background art, the way to increase an area density of stored data in a magnetic recording medium is to reduce the grain size and thickness. The reduction of grain size leads to sharper transitions and a larger SNR. The reduction of the remnant moment-thickness product ($M_r\delta$) leads to reduced demagnetizing fields and lower noise.

Unfortunately, the reductions in grain size and thickness lead to a reduction in the available energy ($K_uV$) to store written bits (where $K_u$ is the anisotropy constant, and V is the volume of the grain). At room temperature, the presence of thermal energy increases the possibility of magnetization decay, if $K_uV$ is small. The ratio, $K_uV/k_BT$, should be about 60, if the data bits are to remain thermally stable. In the conventional single layered magnetic media, this limiting value is achieved at a recording density of 40 Gb/in$^2$.

To surpass this limit value, alternative techniques and/or materials have been proposed. Utilization of antiferromagnetic underlayers is one of the ways proposed to overcome the thermal instability issue. U.S. Pat. No. 6,020,060, issued to Yoshida et al., discloses using a bcc structured antiferromagnetic layer.

Further, Abarra et al. and Fullerton et al. have proposed in journals and conferences, the addition of one or two stabilizing layers made of a magnetic material, coupled antiferromagnetically to the magnetic recording layer. See E. N. Abarra, H. Sato, A. Inomata, I. Okamoto, and Y. Mizoshita, AA-06, presented at the Intermag 2000 Conference, Toronto, April 2000. Also see, E. N. Abarra, A. Inomata, H. Sato, I. Okamoto, and Y. Mizoshita, "Longitudinal magnetic reording media with thermal stabilization layers," Applied Physics Letters, Vol. 77, No. 16, 2000, pp. 2581. Also see, Eric E. Fullerton, D. T. Margulies, M. E. Schabes, M. Carey, B. Gurney, A. Moser, M. Best, G. Zeltzer, K. Rubin, H. Rosen, and M. Doerner, "Antiferromagnetically coupled magnetic media layers for thermally stable high-density recording," Applied Physics Letters, Vol. 77, No. 23, 2000, pp.3806.

According to the configuration proposed by Abarra et al., two stabilizing ferromagnetic layers are deposited below the main recording layer to improve the thermal stability. Thermal stability is increased because of the increase of grain volume, as well as, due to the antiferromagnetic coupling at two interfaces. Unfortunately, the $M_r\delta$ is not greatly reduced, because the moment of two ferromagnetic layers is reduced by the moment of only one ferromagnetic layer. Therefore, the total $M_r\delta$ remains relatively large.

According to the configuration proposed by Fullerton et al., only one stabilizing layer is deposited below the main recording layer. In this configuration, the $M_r\delta$ reduction is larger than the configuration of Abarra et al. However, the increase of thermal stability is not very large, because the increase in the grain volume is not large, and also there is only one antiferromagnetically coupled interface.

U.S. Pat. No. 6,077,586, issued to Bian et al., discloses a structure similar to that of Fullerton et al. However, the structure of Bian et al. is not based on antiferromagnetic coupling, because Bian et al.'s spacer layer is more than 1 nm in thickness.

Figure 1:
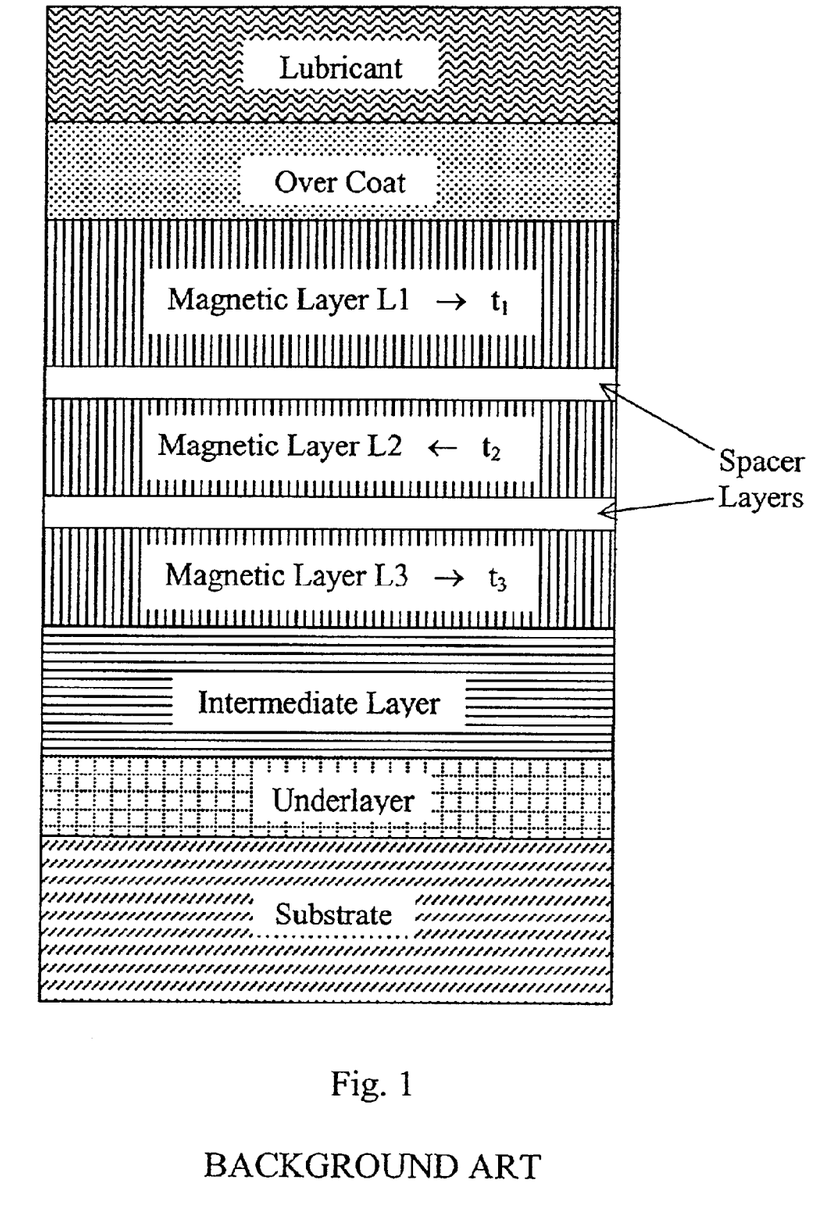
FIG. 1 is a cross sectional view of a thin film magnetic medium, in accordance with a first embodiment of the background art.

FIG. 1 is a cross sectional view showing a configuration of a thin film magnetic disk, in accordance with a first embodiment of the background art. The configuration of FIG. 1 is used by the Fujitsu corporation. The configuration includes a first ferromagnetic layer L1 having a first thickness t1, a second ferromagnetic layer L2 having a second thickness t2, and a third ferromagnetic layer L3 having a third thickness t3. The first layer L1 is the main recording layer. Non-ferromagnetic spacer layers separate the second ferromagnetic layer L2 from the first and third ferromagnetic layers L1 and L3. An intermediate layer, underlayer and substrate reside beside the first ferromagnetic layer L1. Further, an overcoat and lubricate reside beside the third ferromagnetic layer L3. In this configuration, $M_r$ is defined as the remnant moment. Even if full cancellation of moments between the layers L1, L2, L3, at remanence is assumed, the total $M_r\delta$ is given by Mr (t1−t2+t3).

Figure 2:
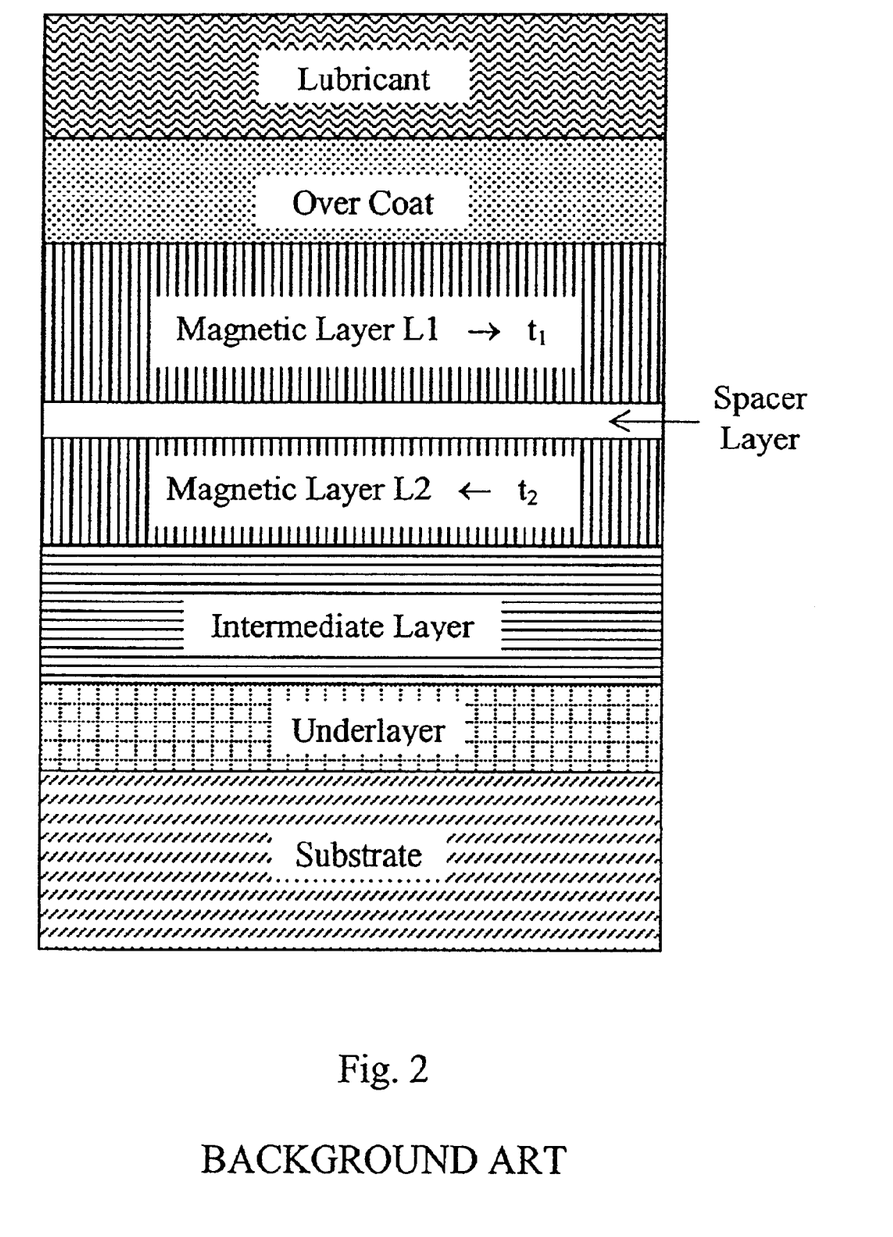
FIG. 2 is a cross sectional view of a thin film magnetic medium, in accordance with a second embodiment of the background art.

FIG. 2 is a cross sectional view showing a configuration of a thin film magnetic disk, in accordance with a second embodiment of the background art. The configuration of FIG. 2 is used by the IBM corporation. The configuration includes a first ferromagnetic layer L1 and a second ferromagnetic layer L2. The first ferromagnetic layer L1 has a thickness of t1, and the second ferromagnetic layer L2 has a thickness of t2. A non-ferromagnetic spacer layer reside between the first and second ferromagnetic layers L1 and L2. Again, the thin film magnetic disk includes a substrate, an underlayer, an intermediate layer, an overcoat and a lubricant, as discribed in conjunction with FIG. 1. In this configuration, the total $M_r\delta$ is given by Mr (t1−t2), if full cancellation of the moments between the layers at remanence is assumed. Thus, in the configurations of FIGS. 1 and 2, the reduction of the $M_r\delta$ comes from only one stabilizing layer, namely layer L2.

SUMMARY OF THE INVENTION

In the background art, a reduction in $M_r\delta$ comes from only one of the stabilizing layers, namely the layer L2 in FIGS. 1 and 2. The present invention appreciates that if the reduction of $M_r\delta$ comes from two stabilizing layers, the recording media will be less noisy, i.e. a higher SNR can be achieved. Also, the present invention appreciates that if there are two or more anti-ferromagnetically coupled interfaces, the data will be more thermally stable. Therefore, the total number of ferromagnetic layers is three or more. The present invention proves a thin film magnetic media for storing data having a relatively increased thermal stability and a relatively reduced $M_r\delta$ in comparison to the background art configurations.

Another object of the present invention is to provide a fabrication method for a high-density longitudinal magnetic recording medium, which can support an ultra high recording area density relative to the background art configurations.

Yet another object of the present invention is to provide a medium having magnetic layers disposed adjacent to non-ferromagnetic spacer layers, such as Ru. The antiparallel coupling between the layers cause a reduction in the $M_r\delta$. In such a configuration, the $M_r\delta$ reduction comes from two layers. Such a media is suitable for very high-density recording.

It is a further object of the present invention to provide a magnetic recording medium with three ferromagnetic layers. Two non-ferromagnetic spacer layers separate the three ferromagnetic layers from each other. Out of the three ferromagnetic layers, the middle layer is thicker than the other two layers and is the main recording layer. The $M_r\delta$ reduction comes from the top and bottom ferromagnetic layers and so, the $M_r\delta$ reduction is larger. Because of two antiferromagnetically-coupled interfaces and a larger grain volume the thermal stability is also larger.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 3A:
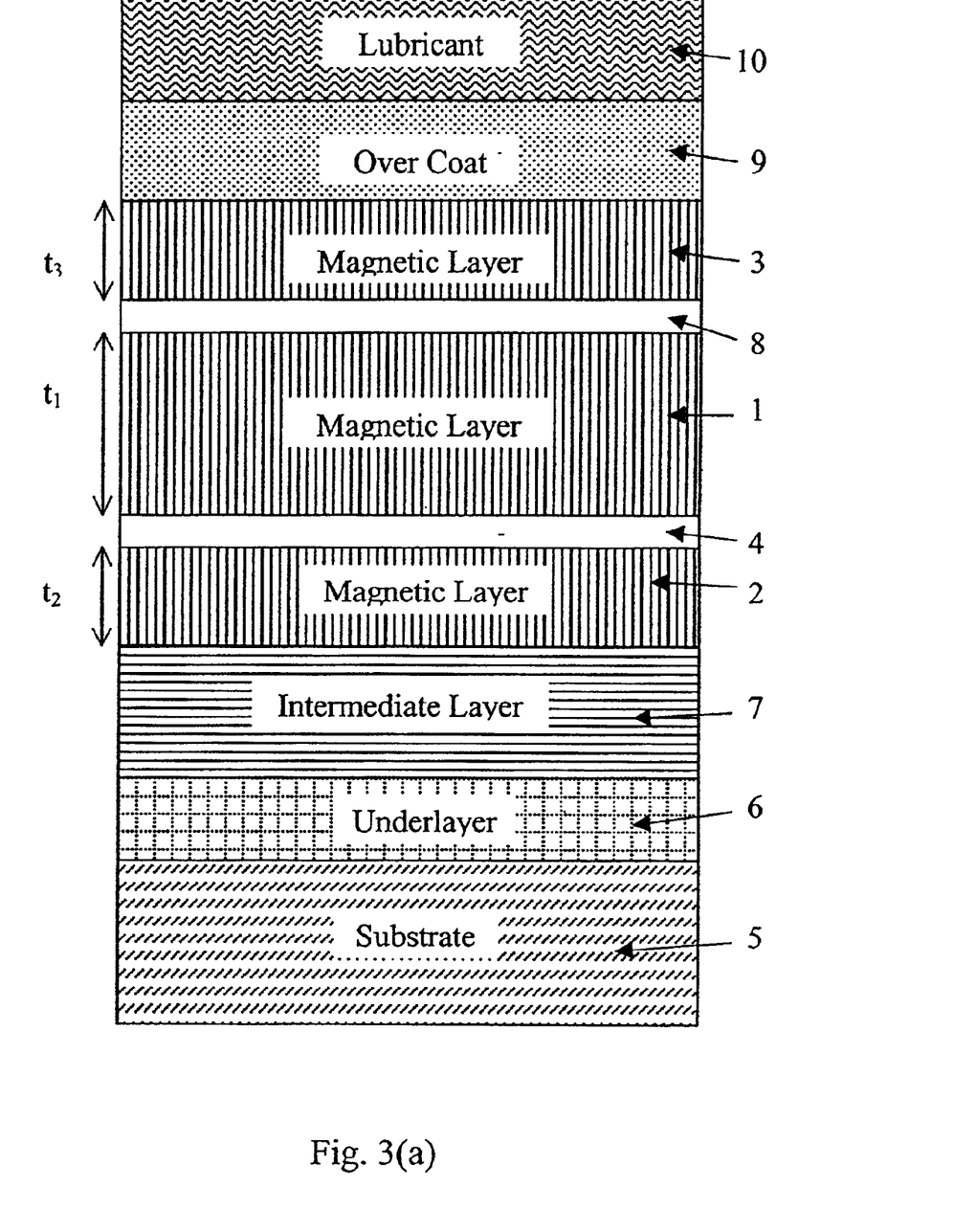
FIG. 3(a) is a cross sectional view of a thin film magnetic medium, in accordance with a first embodiment of the present invention.

FIG. 3(a) is a cross sectional view showing a configuration of a thin film magnetic medium, such as a disk, in accordance with a first embodiment of the present invention. The thin film magnetic medium includes a first ferromagnetic layer 1 having a first thickness t1, a second ferromagnetic layer 2 having a second thickness t2, and a third ferromagnetic layer 3 having a third thickness t3. The first thickness t1 is much thicker than the second thickness t2 and the third thickness t3 (t1>t2, and t1>t3). Further, the first thickness t1 is greater than the sum of the second thickness t2 and the third thickness t3 (t1>(t2+t3)).

The first ferromagnetic layer 1 is the main recording layer. The second ferromagentic layer 2 and the third ferromagnetic layer 3 are stabilizing layers or Mrt reducing layers. The first, second and third ferromagnetic layers 1, 2, 3 can be made of a Co alloy, or other suitable materials. Further, the first, second and third ferromagnetic layers 1, 2, 3 can be formed of two or more layers of ferromagnetic materials, respectively.

The first ferromagnetic layer 1 has a first side and a second side. A first non-ferromagnetic spacer layer 4 is located on the first side of said first ferromagnetic layer 1, between the first ferromagnetic layer 1 and the second ferromagnetic layer 2. Likewise, a second non-ferromagnetic spacer layer 8 is located on the second side of the first ferromagnetic layer 1, between the first ferromagnetic layer 1 and the third ferromagnetic layer 3. The first and second non-ferromagnetic spacer layers 4 and 8 could be made of Ruthenium (Ru), Rhodium (Rh), an alloy of Ruthenium, an alloy of Rhodium, an alloy of Ruthenium and Rhodium, or other suitable materials.

The first and second non-ferromagnetic spacer layers 4 and 8 each have a thickness of less than 1 nm. Preferably, the first and second non-ferromagnetic spacer layers 4 and 8 each have a thickness of between 0.3 and 0.9 nm. The first and second non-ferromagnetic spacer layers 4 and 8 each have a hcp or bcc structure, so as to function as a layer to induce an antiparallel magnetic coupling between adjacent, neighboring ferromagnetic layers. Namely, the first non-ferromagnetic spacer layer 4 induces an antiparallel magnetic coupling between the first ferromagnetic layer 1 and the second ferromagnetic layer 2, and the second non-ferromagnetic spacer layer 8 induces an antiparallel magnetic coupling between the first ferromagnetic layer 1 and the third ferromagnetic layer 3.

In FIG. 3(a), the first non-ferromagnetic spacer 4 is illustrated as a single layer. Of course, the single layer could be replaced by two or more layers. For example, two spacer layers of different compositions could be placed one on top of the other between the first ferromagnetic layer 1 and the second ferromagnetic layer 2, such as a first layer of Ru having 0.3 nm thickness, followed by a second layer of Rh having a 0.4 nm thickness.

In FIG. 3(a), the first, second and third ferromagnetic layers 1, 2, 3 are illustrated as single layers. Of course, a single ferromagnetic layer could also be replaced by two or more layers. For example, the first ferromagnetic layer 1 could be made of two layers with different magnetic properties or microstructural properties for the optimization of epitaxial growth or thermal stability.

In FIG. 3(a), a substrate 5 is provided for the thin film magnetic medium. The substrate 5 is preferably formed of glass or a NiP coated aluminum or aluminum alloy. An underlayer 6 and intermediate layer 7 are provided between the substrate 5 and the second ferromagnetic layer 2. The intermediate layer 7 is preferably located between the underlayer 6 and the second ferromagnetic layer 2. The intermediate layer 7 is formed of a Co alloy, a Cr alloy, or other suitable materials. The underlayer 6 is non-ferromagnetic and preferably formed of a Cr alloy, or other suitable material.

An overcoat 9 is provided on the third ferromagnetic layer 3. Further, a lubricant 10 is provided on the overcoat 9. The overcoat 9 may be formed of carbon The overcoat 9 and lubricant 10 protect the thin film magnetic disk. In forming the thin film magnetic disk, the various layers may be deposited one onto the other, such as by a sputtering process.

In the present invention, the $M_r\delta$ is given by $M_r(t1-t2-t3)$. As is apparent from this equation, the $M_r\delta$ is reduced by the magnetization of two layers. In other words, the magnetization of the second ferromagnetic layer 2 and the third ferromagnetic layer 3 act to reduce the $M_r\delta$. Therefore, the reduction in $M_r\delta$ is relatively larger, as compared to the configurations of background art, illustrated in FIGS. 1 and 2. Since the configuration of the present invention also includes two antiferromagnetically coupled interfaces with an interface coupling constant J, the thermal stability will be relative higher, as compared to the configurations of the background art. Therefore, with a lower $M_r\delta$ and a higher thermal stability, the configuration of the present invention is more suitable for ultrahigh density recording and storage of data.

Figure 3B:
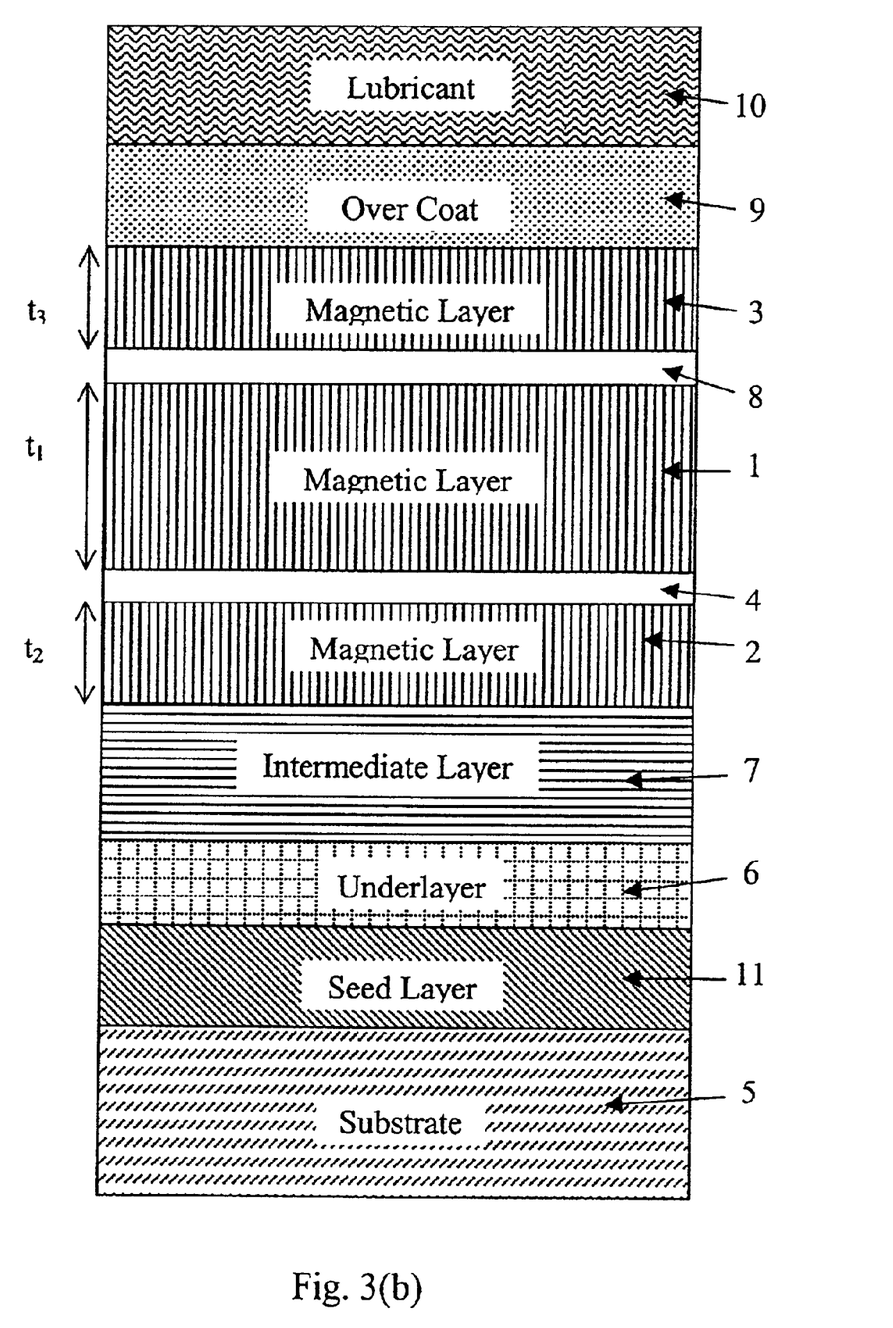
FIG. 3(b) is a cross sectional view of a thin film magnetic medium, in accordance with a second embodiment of the present invention.

FIG. 3(b) is a cross sectional view showing a configuration of a thin film magnetic disk, in accordance with a second embodiment of the present invention. The second embodiment of the present invention is similar to the first embodiment, except for the presence of a seedlayer 11 disposed between the underlayer 6 and the substrate 5. The seedlayer 11 may be formed of NiAl, a Cr alloy, or other suitable material, such as a material having a B2 structure. The seedlayer 11 may also be formed as an amorphous film. Again, the thin film magnetic disk may be formed by depositing the various layers one onto the others.

Figure 3C:
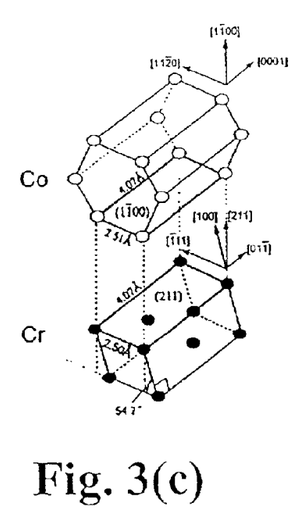
FIG. 3(c) is a crystal lattice diagram illustrating a matching of Cr layers and Co-alloy layers for Cr(211) and Co(100) orientations.
Figure 3D:
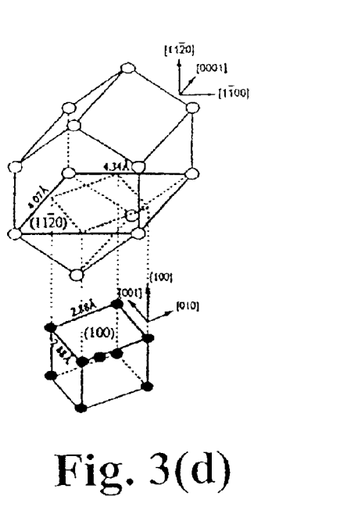
FIG. 3(d) is a crystal lattice diagram illustrating a matching of Cr layers and Co-alloy layers for Cr(200) and Co(110) orientations.

FIG. 3(c) and 3(d) are crystal lattice diagrams illustrating a matching of Cr layers and Co-alloy magnetic layers. FIG. 3(c) illustrates a matching of Cr layers and Co-alloy layers for Cr(211) and Co(100) orientations. FIG. 3(d) illustrates a matching of Cr layers and Co-alloy layers for Cr(200) and Co(110) orientations.

In accordance with the present invention, the underlayer 6 and/or the seedlayer 11 could have a particular structure, such as illustrated by the Cr(211) orientation of FIG. 3(c) or the Cr(200) orientation of FIG. 3(d). Also, the ferromagnetic layers could have a particular structure, such as illustrated by the Co(100) orientation of FIG. 3(c) or the Co(110) orientation of FIG. 3(d).

Figure 3E:
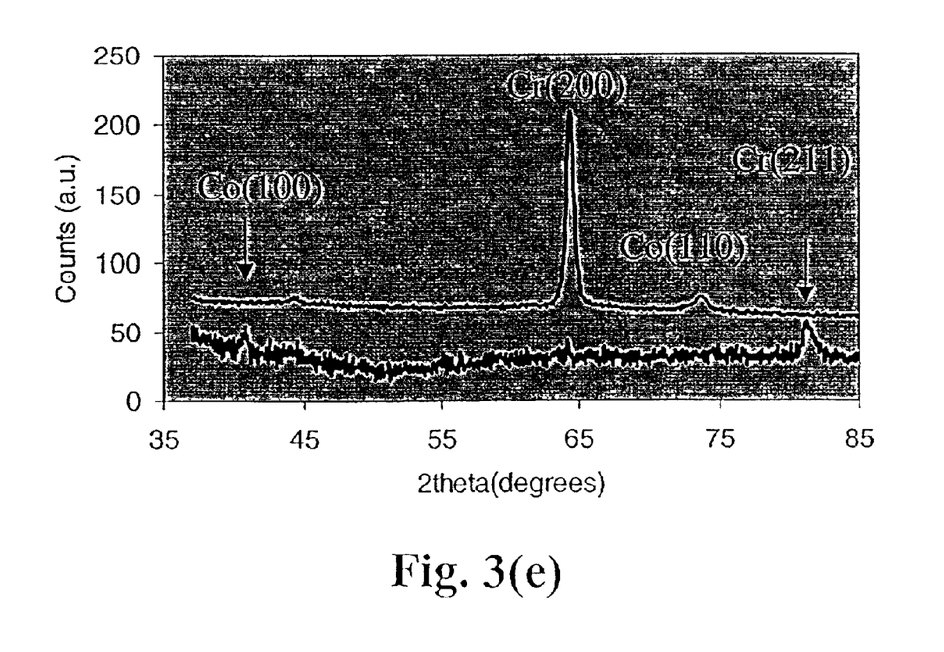
FIG. 3(e) is a graph illustrating an X-ray diffraction pattern of layers with the Cr(211) and Cr(200) orientations.

FIG. 3(e) illustrates an X-ray diffraction pattern of films with the Cr(211) and Cr(200) orientations. In FIG. 3(e), the lower line illustrates the diffraction pattern for the Cr(211) and Co(100) orientation. XRD peaks are indicated beneath the arrows associated with the labels Cr(211) and Co(100). In FIG. 3(e), the upper line illustrates the diffraction pattern for the Cr(200) and Co(110) orientation. XRD peaks are indicated beneath the labels Cr(200) and Co(110).

Figure 4A:
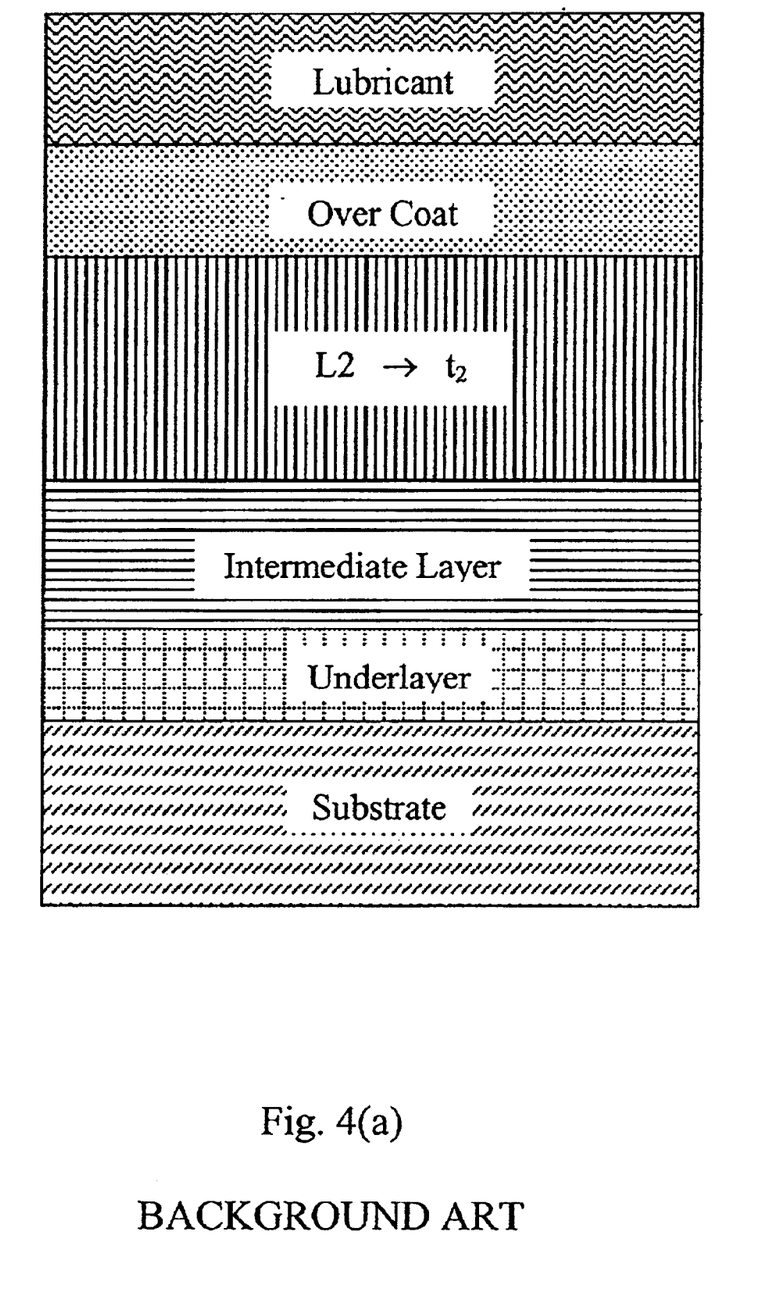
FIG. 4(a) is a cross sectional view of a thin film magnetic medium, in accordance with a third embodiment of the background art.
Figure 4B:
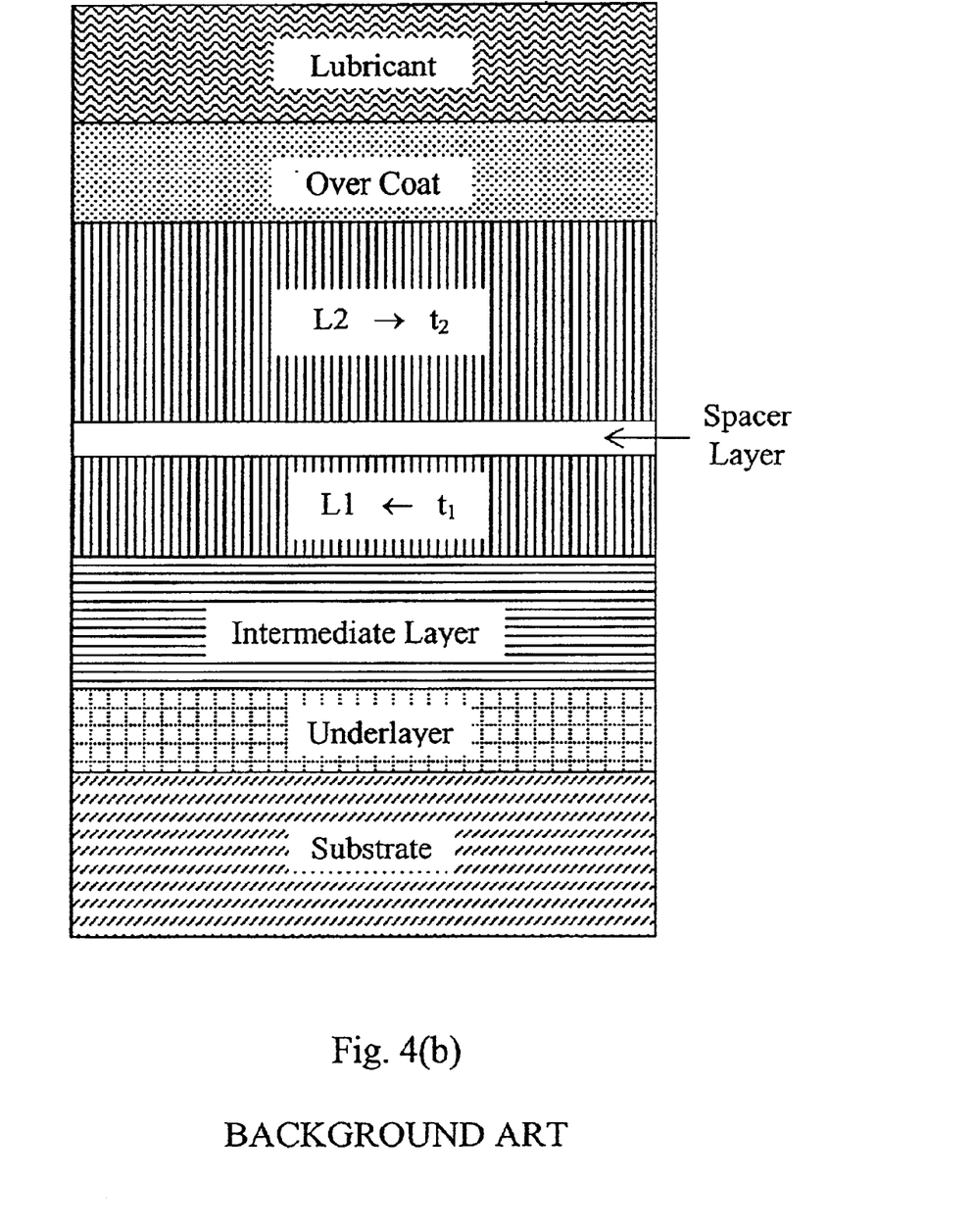
FIG. 4(b) is a cross sectional view of a thin film magnetic medium, in accordance with the second embodiment of the background art.
Figure 4C:
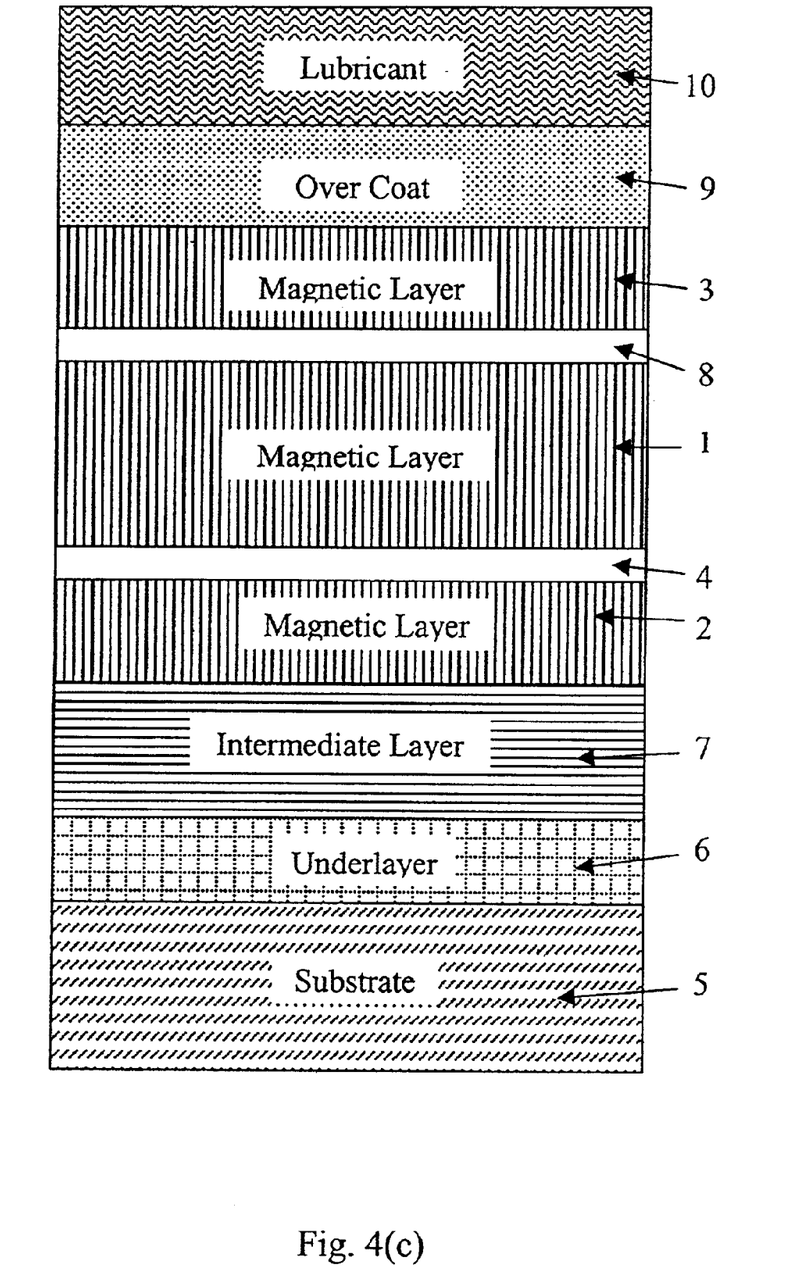
FIG. 4(c) is a cross sectional view of a thin film magnetic medium, in accordance with the first embodiment of the present invention.

FIGS. 4(a), 4(b) and 4(c) illustrate three configurations of disks, constructed in a laboratory and subjected to testing. The testing demonstrates the improved thermal stability of the present invention, as compared to the background art. FIG. 4(a) shows a disk with a single magnetic layer L1, as in commercial disk drives with an area density of about 10 $Gb/in^2$. FIG. 4(b) shows a disk with two magnetic layers L1 and L2, coupled antiferromagnetically, as in the configuration used by the IBM corporation, as illustrated in FIG. 2. FIG. 4(c) shows the configuration of the present invention with three magnetic layers 1, 2, and 3.

Figure 5A:
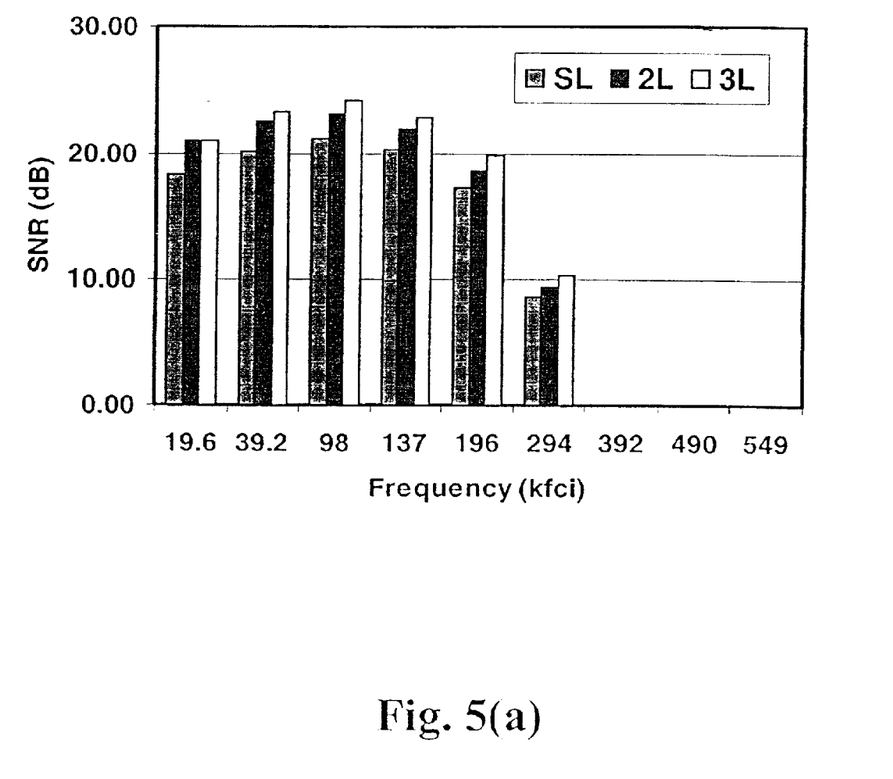
FIG. 5(a) is a bar chart showing test results of the thin film magnetic media of FIGS. 4(a), 4(b) and 4(c)

FIG. 5(a) is a bar chart showing the test results. The horizontal axis shows a linear density or frequency of the data storage on the magnetic structure expressed in kilo flux changes per inch (kfci). The vertical axis shows the signal to noise ratio (SNR) expressed in decibels (dB). In FIG. 5(a), the SNR of the single layer magnetic structure (FIG. 4(a)), the two layer magnetic structure (FIG. 4(b)) and three layer magnetic structure (FIG. 4(c)) is illustrated at six frequencies of storage. It can be noted that the three layered magnetic structure of the present invention shows a larger SNR at higher densities.

Figure 5B:
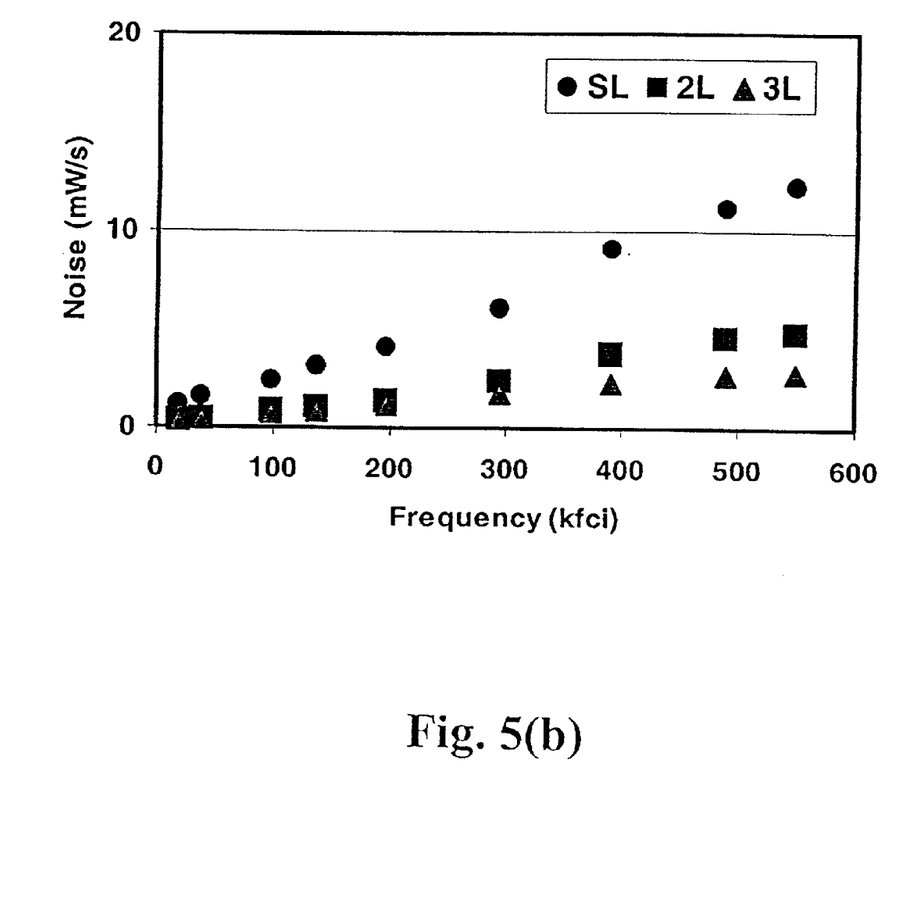
FIG. 5(b) is a chart showing additional test results of the thin film magnetic media of FIGS. 4(a), 4(b) and 4(c)

FIG. 5(b) is a chart illustrating the lower noise characteristics of the three layer magnetic structure (FIG. 4(c)) versus the single layer magnetic structure (FIG. 4(a)) and the two layer magnetic structure (FIG. 4(b)). In FIG. 5(b), the vertical axis shows noise as measured in mW/s. The horizontal axis shows a linear density or frequency of the data storage on the magnetic structure expressed in kfci.

Figure 6:
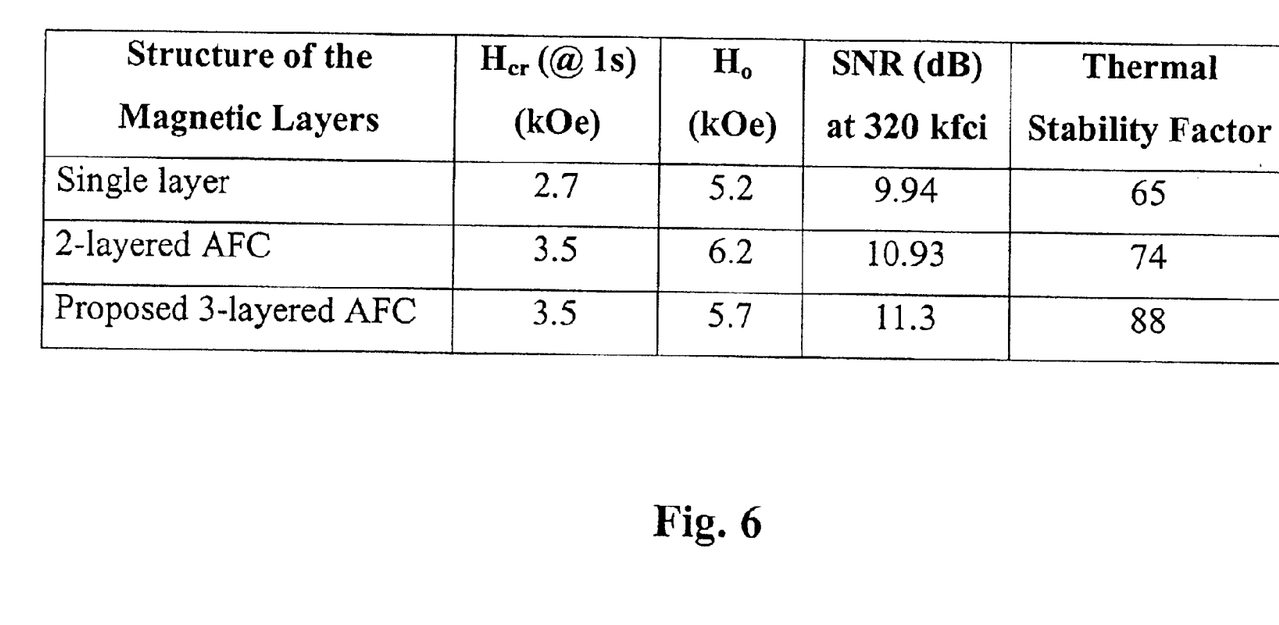
FIG. 6 is a table showing data of the test results of FIG. 5.

Using the data of remnant coercivity measured at different time-scales, thermal stability factor and $H_0$ were estimated from Sharrock's equation. The table of FIG. 6 shows the remnant coercivity ($H_{cr}$), measured using Alternating Gradient Force Magnetometer (AGM) at a time-scale of 1s and $H_0$ (a field proportional to the writing field). The data in the table of FIG. 6 shows the SNR and measured thermal stability (expressed as $K_uV/k_BT$) of the single layer (FIG. 4(a)), two layer (FIG. 4(b)) and the three layer (FIG. 4(c)) magnetic structures. It is clear from the table that the Laminated Anti-ferromagnetically Coupled (LAC) media (both the two layer and three layer configurations) show a larger coercivity and thermal stability factor in comparison to the single layer configuration. A three layer magnetic configuration shows more thermal stability compared to the two layer LAC configuration. It is also interesting to note that although the $H_{cr}$ at 1s is the same for the two layer and three layer LAC media, $H_0$ is less for the 3-layer LAC media. A lower Ho would enable easier writing on the three layer LAC media. These results indicate that the three layer magnetic medium of the present invention is more suitable for ultrahigh density recording and storage of data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A thin film magnetic medium for storing data, said medium comprising:

a main recording layer having a first thickness of ferromagnetic material and having a first side and a second side;

a first non-ferromagnetic spacer layer located on said first side of said main recording layer;

a second non-ferromagnetic spacer layer located on said second side of said main recording layer;

a substrate;

a non-ferromagnetic underlayer and a first stabilizing layer residing between said substrate and said first non-ferromagnetic spacer layer, wherein said first stabilizing layer has a second thickness of ferromagnetic material which is less than said first thickness; and a second stabilizing layer located on a side of said second non-ferromagnetic spacer layer opposite to said main recording layer, wherein said second stabilizing layer has a third thickness of ferromagnetic material which is less than said first thickness, wherein said first thickness is greater than said second thickness combined with said third thickness.

2. The medium according to claim 1, wherein said medium is a disk for a hard drive.

3. The medium according to claim 1, wherein said non-ferromagnetic underlayer contacts said substrate and wherein said first stabilizing layer contacts said first non-ferromagnetic spacer layer.

4. The medium according to claim 1, wherein said substrate is formed of glass or a NiP coated Al alloy.

5. The medium according to claim 1, further comprising:
a seedlayer located between said non-ferromagnetic underlayer and said substrate.

6. The medium according to claim 5, wherein said seedlayer is an alloy contain at least one of NiAl and Cr.

7. The medium according to claim 5, wherein said seedlayer is an amorphous film.

8. The medium according to claim 1, further comprising:
an intermediate layer located between said non-ferromagnetic underlayer and said first stabilizing layer.

9. The medium according to claim 8, wherein said intermediate layer is an alloy containing at least one of Co and Cr.

10. The medium according to claim 1, wherein said first and second non-ferromagnetic spacer layers are formed of one of ruthenium and rhodium.

11. The medium according to claim 1, wherein said first and second non-ferromagnetic spacer layers are alloys which include at least one of ruthenium and rhodium.

12. The medium according to claim 1, wherein a thickness of each of said first and second non-ferromagnetic spacer layers is greater than or equal to 0.3 nm; and
wherein a thickness of each of said first and second non-ferromagnetic spacer layers is less than or equal to 0.9 nm.

13. The medium according to claim 1, wherein said non-ferromagnetic spacer layers have a hcp or bcc structure and function as a layer to induce antiparallel magnetic coupling between the ferromagnetic layers on opposite sides thereof.

14. The medium according to claim 1, wherein each of said main recording layer and said first and second stabilizing layers are formed of a Co alloy.

15. The medium according to claim 1, wherein said main recording layer and said first and second stabilizing layers, said first and second non-ferromagnetic spacer layers are deposited one onto the other by a sputtering process.

16. The medium according to claim 1, wherein each of said main recording layer and said first and second stabilizing layers are formed bilayers or multilayer of ferromagnetic materials.

17. The medium according to claim 1, wherein said substrate is formed of glass or a NiP coated Al alloy, wherein said first and second non-ferromagnetic spacer layers include at least one of ruthenium and rhodium, and each have a thickness between 0.3 and 0.9 nm, and wherein each of said first, second and third ferromagnetic layers are formed of a Co alloy.

18. The medium according to claim 17, further comprising:
a seedlayer located between said non-ferromagnetic underlayer and said substrate, wherein said seedlayer is an alloy contain at least one of NiAl and Cr.

19. The medium according to claim 18, further comprising:
an intermediate layer located between said non-ferromagnetic underlayer and said first stabilizing layer, wherein said intermediate layer is an alloy containing at least one of Co and Cr.

* * * * *